July 30, 1929. H. F. MAXIM 1,722,933
AUTOMATIC LATHE
Filed Oct. 23, 1924 9 Sheets-Sheet 2
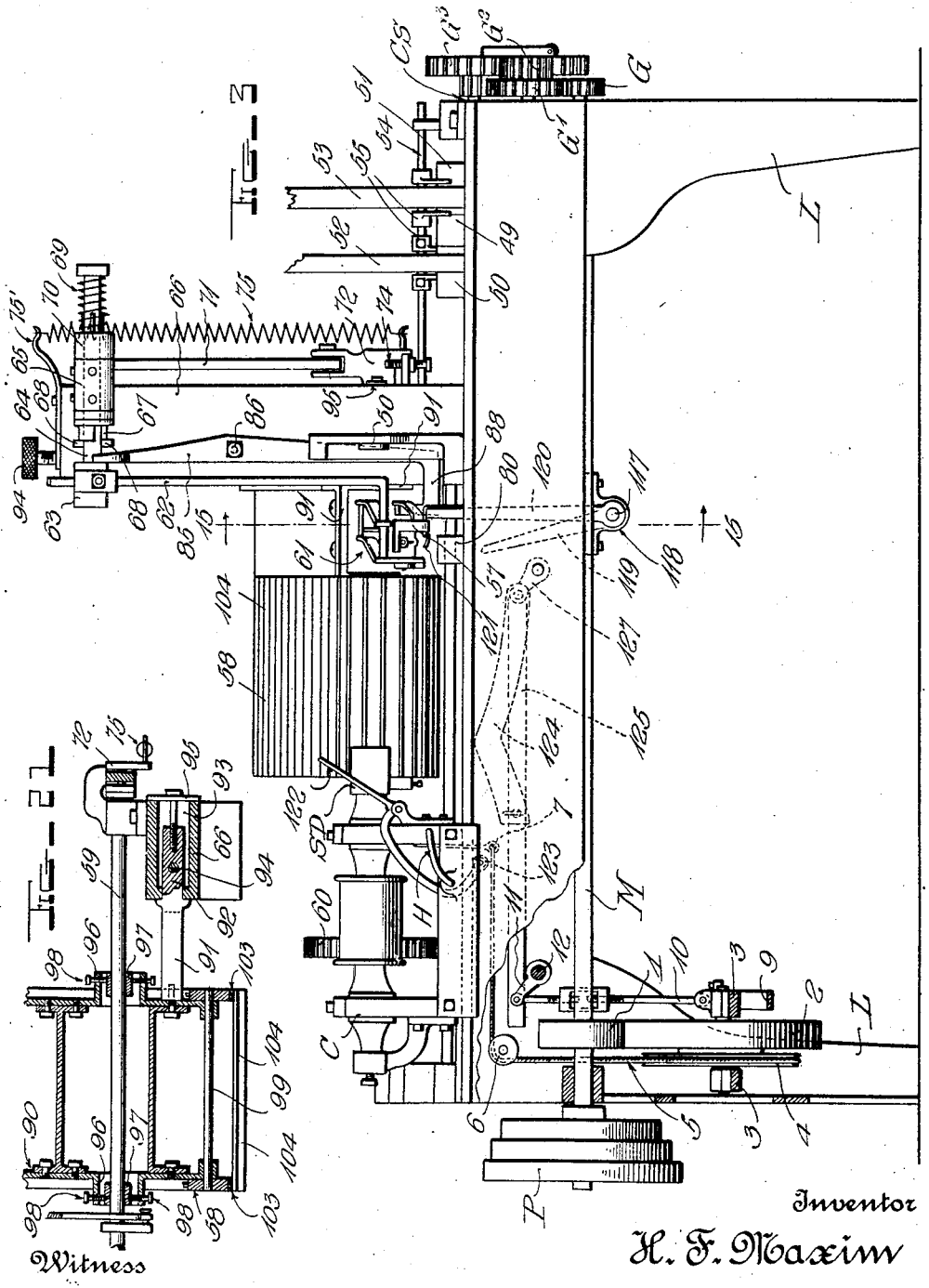
Inventor
H. F. Maxim
By H. B. Willson & Co.
Attorneys
Witness

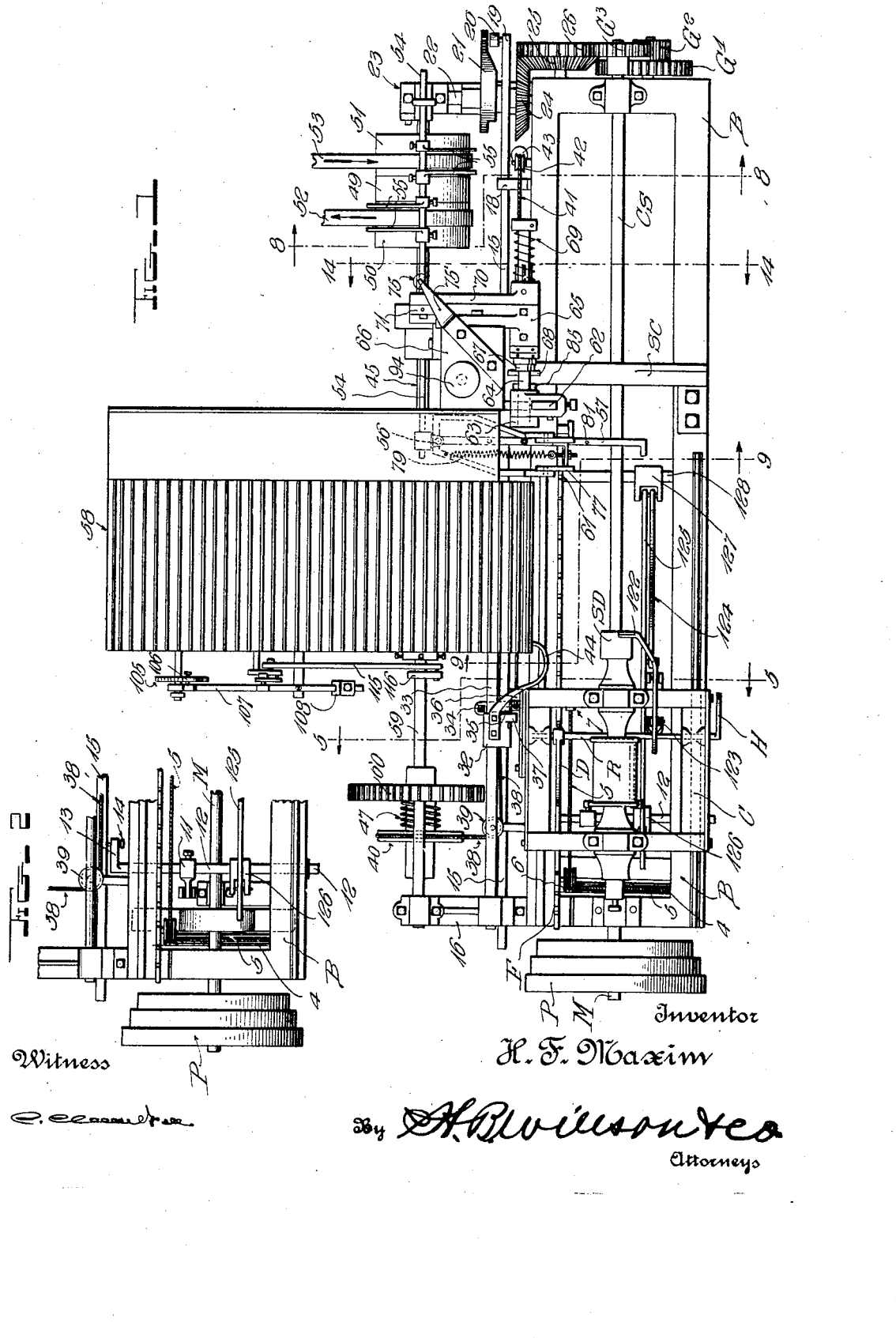

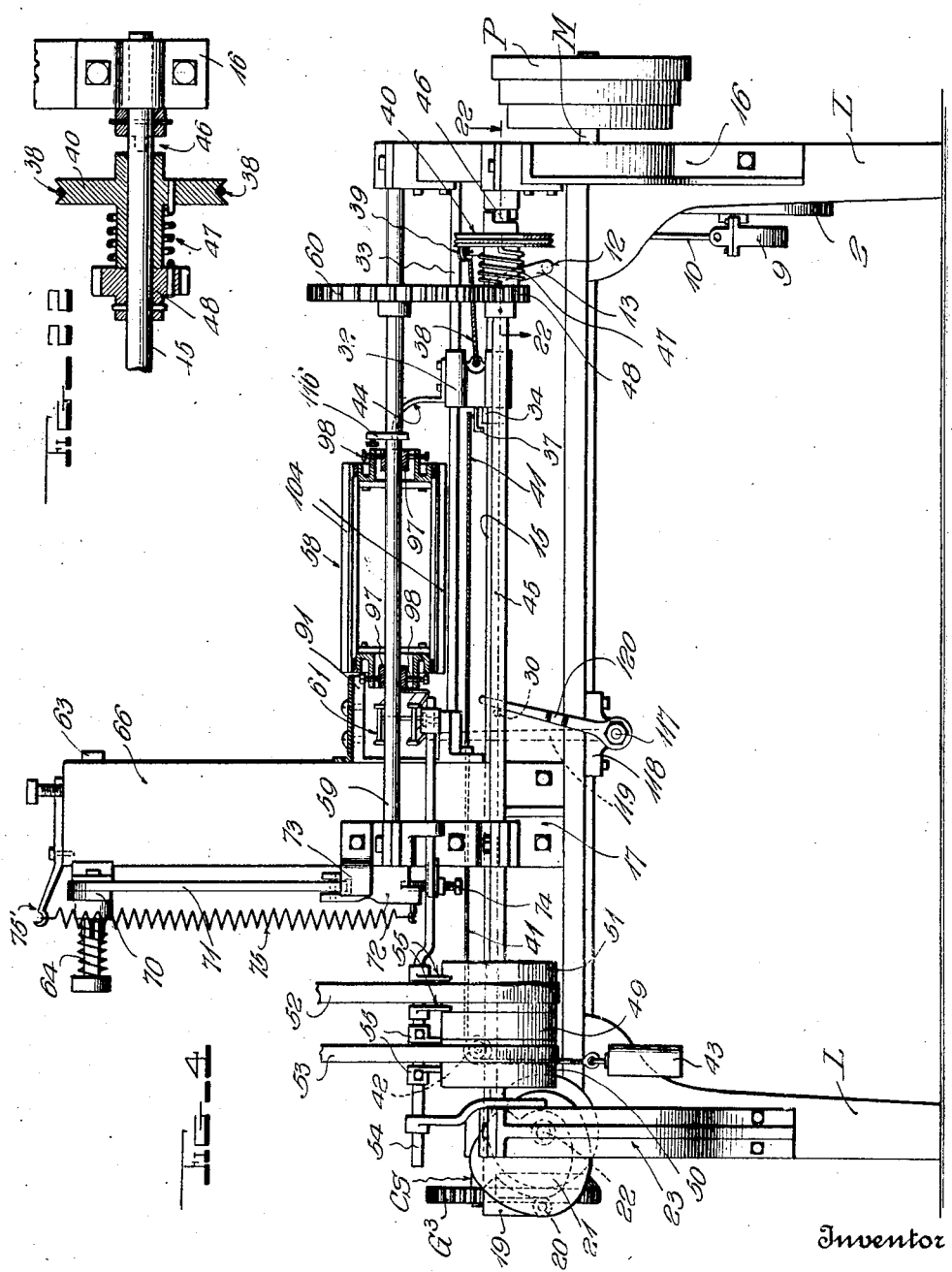

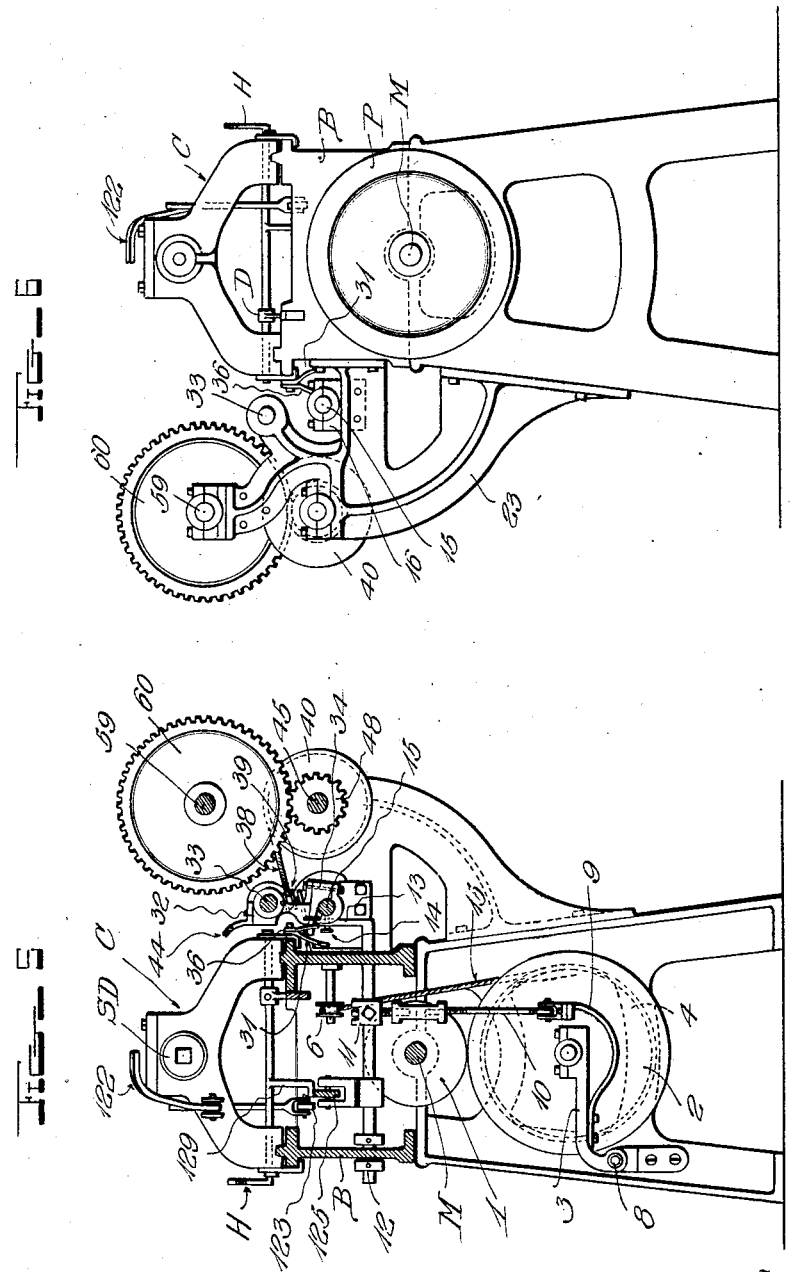

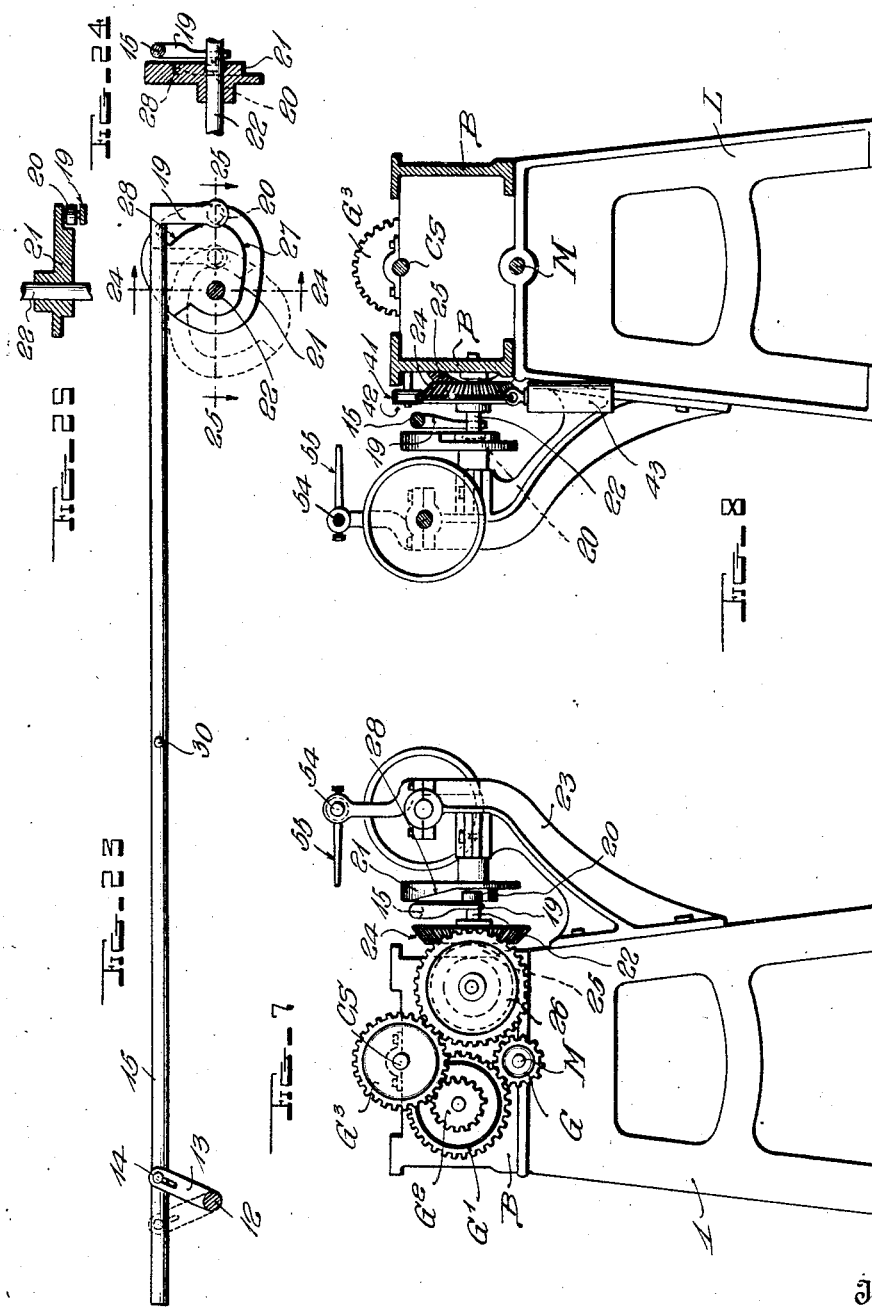

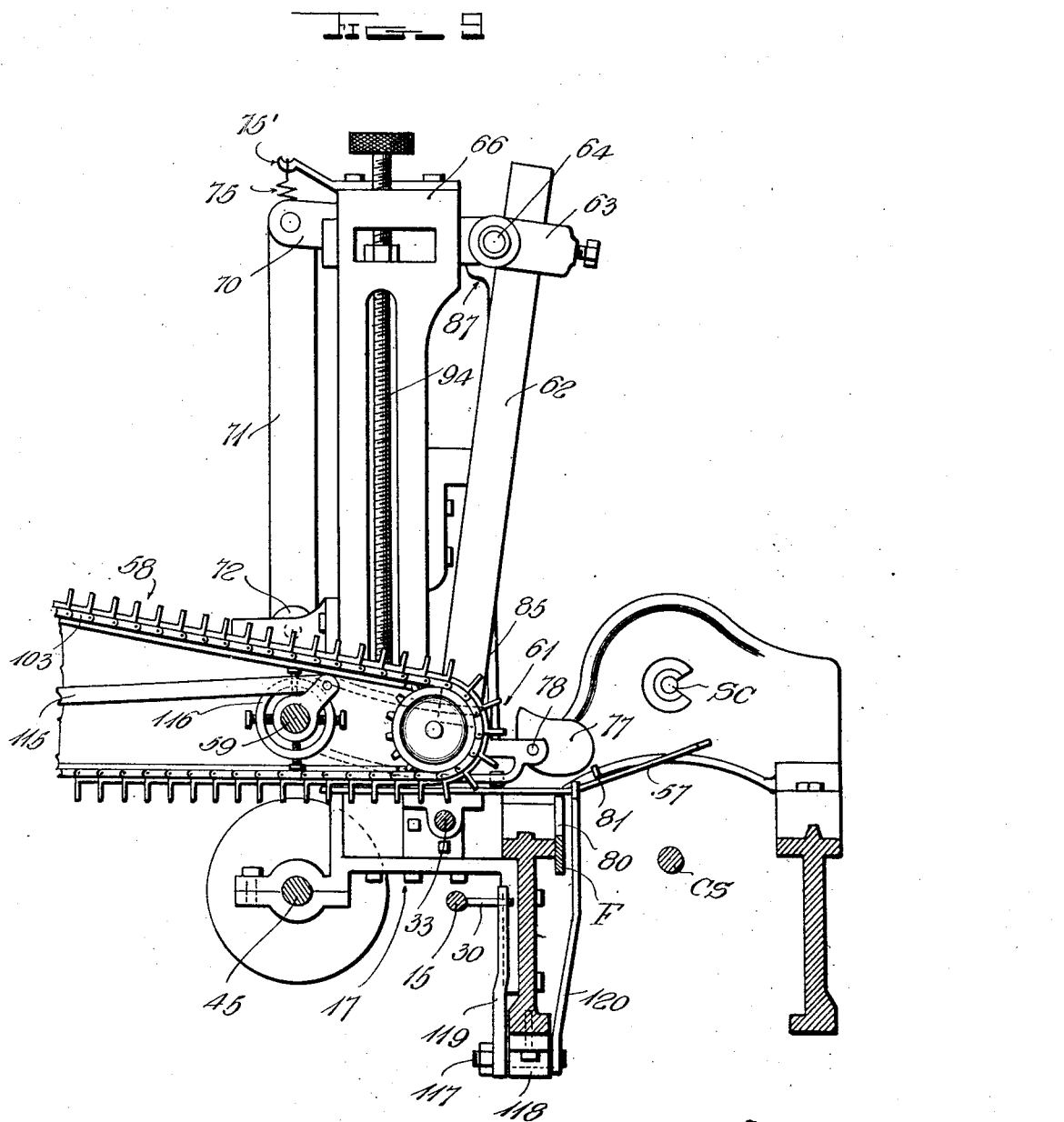

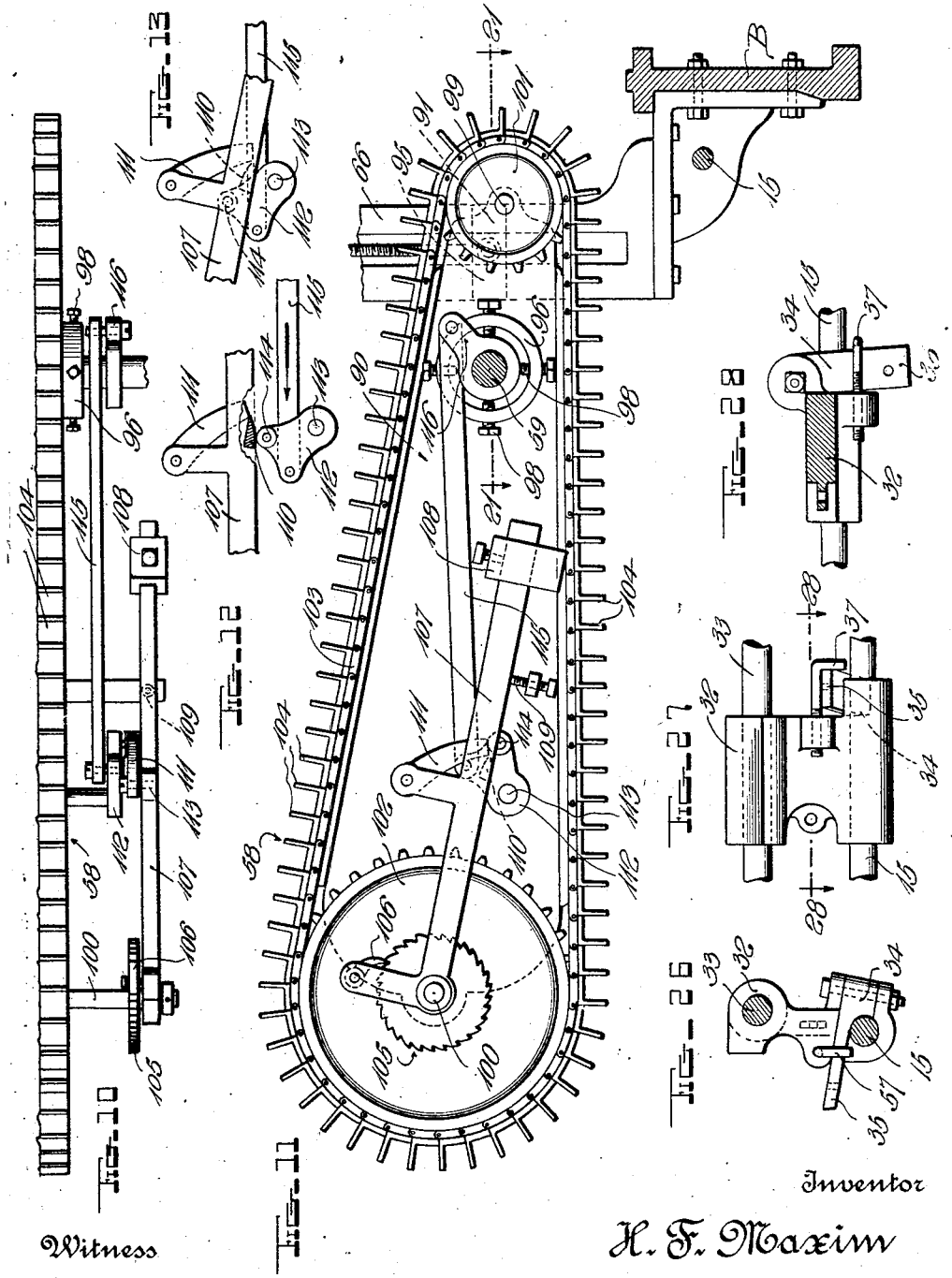

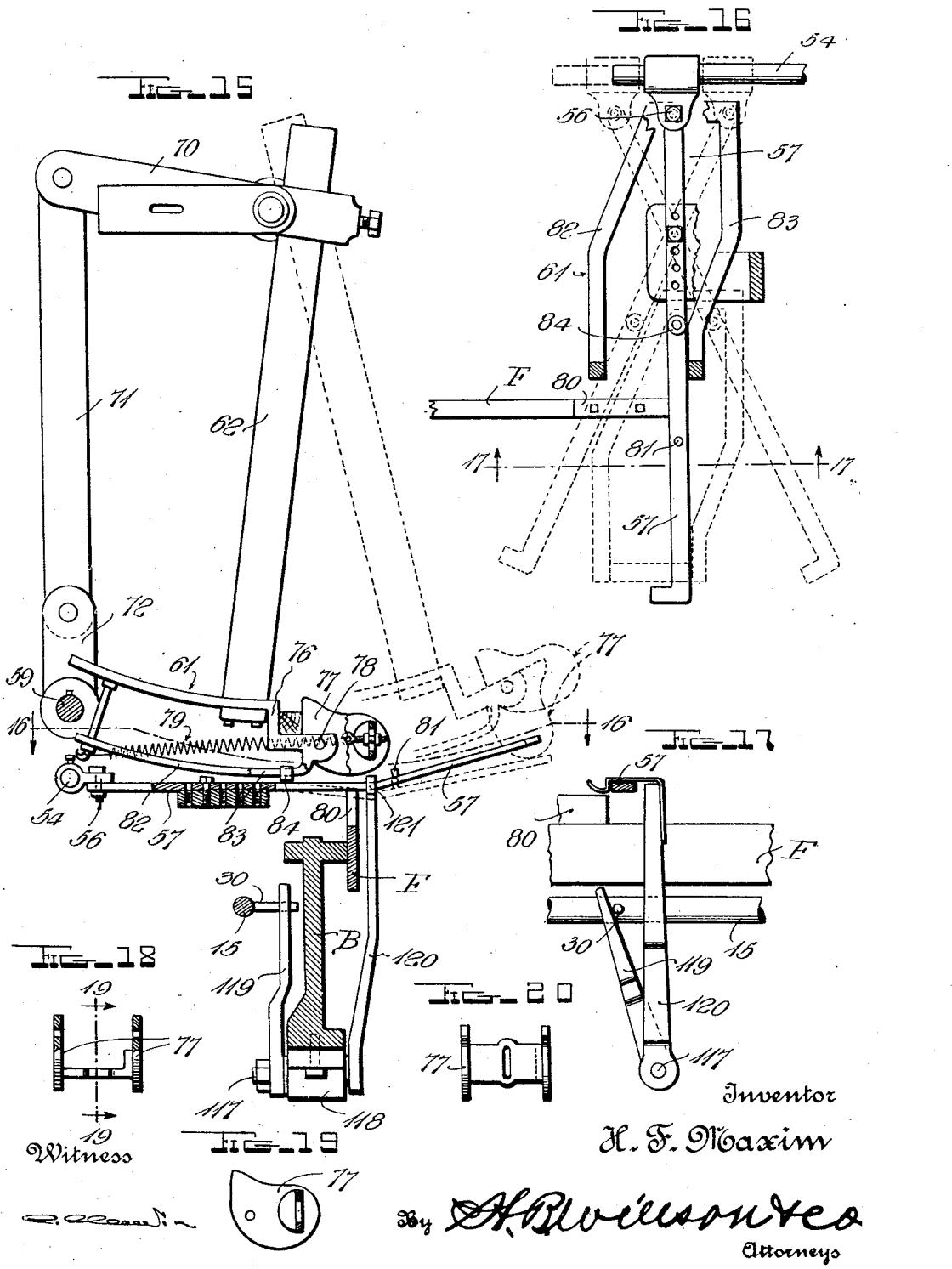

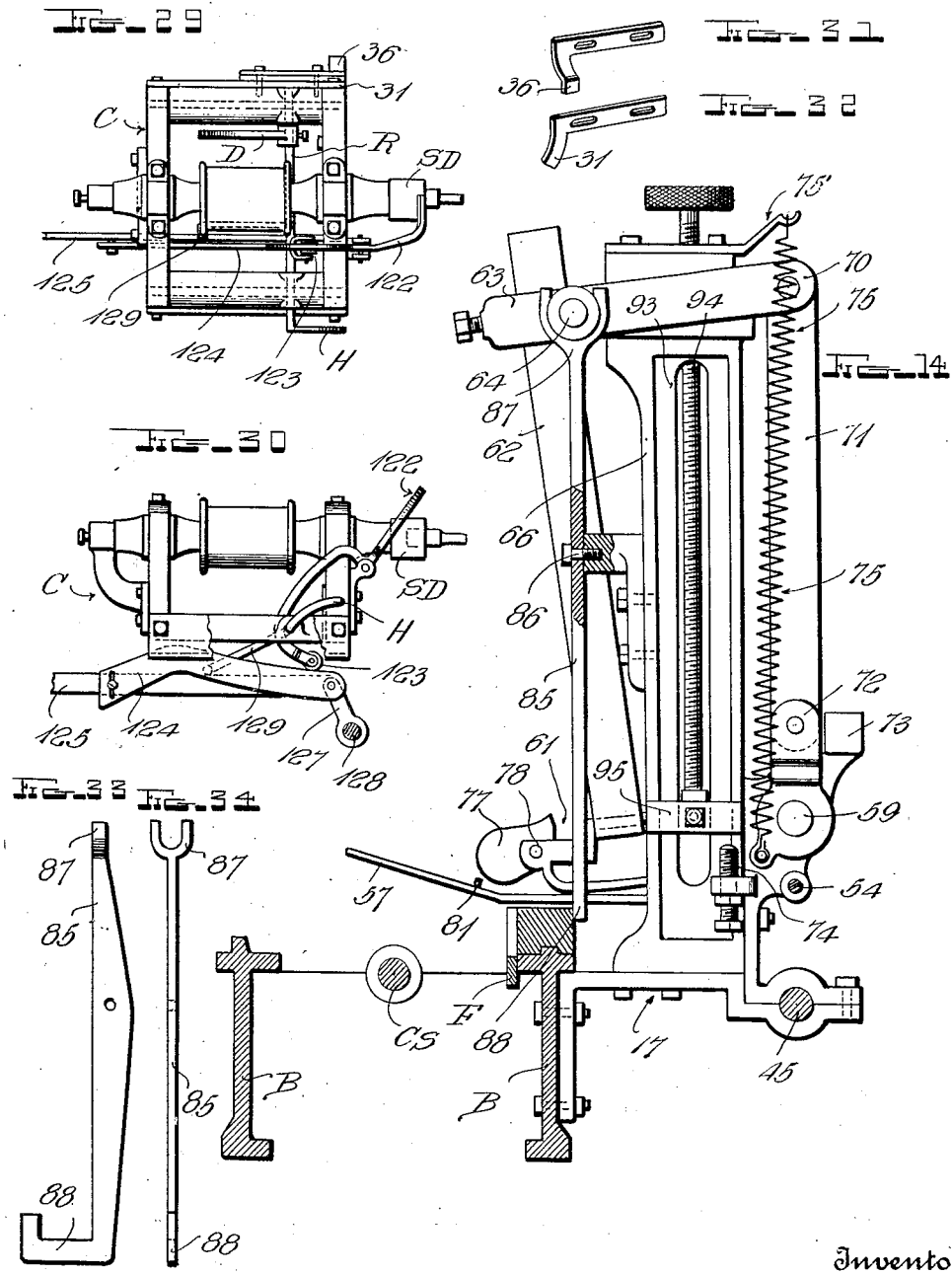

Patented July 30, 1929.

1,722,933

UNITED STATES PATENT OFFICE.

HOWARD F. MAXIM, OF LOCKE MILLS, MAINE.

AUTOMATIC LATHE.

Application filed October 23, 1924. Serial No. 745,445.

In the manufacture of spools and other varieties of wood turned novelties, a machine has heretofore been extensively used, in which a carriage is movable along a bed to drive a stick of lumber or "square" and advance it through cutting means which impart the desired formation thereto. After the last turning operation upon the stick, the latter is sawed off or otherwise cut off by the machine, leaving a stick remnant in the chuck of the carriage, which remnant is commonly known as a "stub short". This carriage is then returned to its starting position by hand, the "stub short" is removed by hand, and another stick is engaged with the chuck by hand, and guided to the cutting means. When operating each machine in this manner, an attendant can give the required attention to only a very few machines, but it is an important object of my invention to provide unique mechanism for returning the carriage, knocking the "stub short" from the chuck, and feeding another "square" or stick to the chuck and cutting means, so that the operation of the machine is automatic throughout and the only work required of the attendant, is to keep the feeder supplied with sticks of lumber, enabling him to attend to a great number of machines.

The sticks used by machines of the general character above described, are of varying lengths, as all knots must be cut from the wood and all good material between such knots used for the formation of the sticks. Thus, in order to save useless movement of the carriage by returning a comparatively great distance when only a short stick is to be next moved to the chuck, it is a further object to provide unique means for limiting the return of the carriage to the exact extent needed for receiving the next stick.

In this connection, a still further aim is to provide a construction in which the stop for so limiting the return movement of the carriage, also acts to automatically throw the carriage return means out of play.

The cutting means above referred to, usually includes a stationary ring cutter through which the stick is advanced by the carriage to round it, and another object is to provide a unique carrier for moving the sticks one at a time into alinement with said cutter and the carriage chuck, and for then longitudinally shifting each stick to said cutter so that as soon as the chuck engages the stick, the latter will be supported and driven independently of the carrier, permitting prompt return of the latter to receive another stick.

A further aim may be here set forth, that is, the provision of a carrier having a movable stick-holding jaw which is released by initial rotation of the stick held thereby, said jaw then preferably operating to throw mechanism into play for returning the carrier to receive the next stick. In this connection, it may be stated that a further aim is to provide a unique spring arrangement for completing either the opening or closing movement of the jaw after said jaw is initially started toward open or closed position.

The sticks are engaged one at a time with the carrier by a feeder upon which they are placed by hand, and a still further object of the invention is to provide novel actuating means for this feeder which will operate only when set in a predetermined position and then released, the projection and retraction of the carrier being utilized, through novel setting means, to effect such setting of said feeder actuating means and to release it only when the carrier has completely retracted in position to receive the next stick.

Other objects are to provide unique adjustable mounting means for the feeder; to provide a single rock shaft for operating the above-named carrier and the aforesaid setting means, and for also controlling the setting of the stop which limits return of the carriage; to provide a unique control member for a number of the moving parts, which member is automatically shifted to certain positions by the movement of the carrier; to provide a novel spring arrangement assisting in projecting and retracting the carrier; to provide novel means for throwing the carriage-returning means into play, including normally separated members, and to make provision for relatively moving these members into operative engagement with each other when the carriage completes its advancement; to provide a machine in which a number of parts necessary to certain mechanisms, also perform functions assisting other mechanisms, and to provide a thoroughly efficient machine which is not needlessly complex, considering the work to be automatically performed.

With the foregoing and minor objects in view, the invention resides in the novel subject matter hereinafter described and claimed, the description being supplemented by the accompanying drawings.

Figure 1 is a top plan view of the machine, showing the carriage nearing the completion of its return stroke.

Figure 2 is a fragmentary plan showing parts which are obscured in Fig. 1, by the carriage.

Figure 3 is a front elevation partly broken away and in section, showing the same relative positions of parts as disclosed in Fig. 1.

Figure 4 is a rear elevation with the feeder in vertical section.

Figure 5 is a vertical transverse sectional view as indicated by line 5—5 of Fig. 1, featuring the carriage-returning means but also disclosing other relations of parts.

Figure 6 is an elevation of the left-hand end of the machine.

Figure 7 is an elevation of the right hand end of the machine.

Figure 8 is a vertical transverse sectional view as indicated by line 8—8 of Fig. 1.

Figure 9 is a vertical transverse section as indicated by line 9—9 of Fig. 1 showing the general association of the feeder with the carrier, the stationary cutter and other parts.

Figure 10 is a top plan view of a portion of the feeder.

Figure 11 is a side elevation of the feeder, illustrating its operating means in an inactive position, but showing the setting and releasing means for said operating means, in readiness to set the latter and then release it, upon return of the carrier to the front end of the feeder, the positions of parts shown in this figure, being those which are assumed when the carrier is projected to its operative position to dispose one stick in alinement with the carriage chuck and the cutting means.

Figure 12 is a detail elevation partly in section, similar to a portion of Fig. 11, and illustrating the manner in which the operating means for the feeder is set by a novel setting and releasing device, when the carrier is retracted toward the front end of the feeder.

Figure 13 is a detail elevation illustrating the manner in which the operating means for the feeder is released by the above-named setting and releasing device, when the carrier has completely returned to the front end of the feeder, in position to receive another stick.

Figure 14 is a vertical transverse sectional view taken substantially on line 14—14 of Fig. 1, illustrating primarily parts of the carrier mounting and operating means.

Figure 15 is a vertical transverse sectional view taken approximately on line 15—15 of Fig. 3, illustrating the association of the carrier with a control member for a number of the mechanisms comprising the machine, and in dotted lines, this view illustrates the manner in which the pivoted jaw of the carrier depresses said control member into the path of an operating member when said jaw is opened upon initial turning of a stick held thereby.

Figure 16 is a horizontal sectional view cut approximately on line 16—16 of Fig. 15, illustrating primarily the cams which move bodily with the carrier and co-act with a roller or other shoe on the control member, to effect certain movements of the latter when the carrier is projected and retracted.

Figure 17 is a vertical sectional view on line 17—17 of Fig. 16.

Figure 18 is a plan view partly in section of the movable jaw of the carrier.

Figure 19 is a vertical sectional view on line 19—19 of Fig. 18.

Figure 20 is a front elevation of the jaw shown in Figs. 18 and 19.

Figure 21 is a detail horizontal sectional view cut substantially on line 21—21 of Fig. 11, illustrating the adjustable mounting means for the feeder.

Figure 22 is a detail horizontal sectional view on line 22—22 of Fig. 4, showing certain parts of the setting means for the adjustable stop which limits the return movement of the carriage and throws the carriage return means out of play.

Figure 23 is for the most part an elevation of the longitudinal shaft upon which the carriage stop slides, and the cam which shifts said shaft in one direction to bring the carriage return means into play.

Figures 24 and 25 are detail sectional views as indicated by the lines 24—24 and 25—25 of Fig. 23.

Figure 26 is an end elevation of the adjustable carriage stop or slide, illustrating the shaft of Fig. 23 in vertical section, as well as a guide rod which assists in guiding the stop or slide.

Figure 27 is a side elevation of the parts shown in Fig. 26.

Figure 28 is a horizontal sectional view on line 28—28 of Fig. 27.

Figure 29 is a top plan view of the carriage and the means employed for releasing the feed dog of said carriage from the feed rack, and for knocking the "stub short" from the carriage chuck. Figure 30 is a side view of these parts.

Figures 31 and 32 are perspective views of a pair of contacts or shoes which are carried by the carriage for purposes to be hereinafter described.

Figure 33 is a front elevation of the lever which returns the carrier in the opposite direction after it has been laterally shifted to longitudinally move a stick to the cutting means.

Figure 34 is an edge view of the lever disclosed in Fig. 32.

In the drawings above briefly described,

B designates a horizontal lathe bed supported on the usual legs L and provided near one end with a suitably mounted stationary cutter SC. A carriage C is slidable along the bed and is provided with an appropriately driven chuck or stick driver SD in axial alinement with the cutter SC. The carriage C is provided with a dog D co-operable with the usual feed rack F, said dog being carried by a rock shaft R mounted on the carriage, this shaft preferably having a handle H by means of which the dog may be manually released if desired.

Extending longitudinally of the bed B is a main drive shaft M having a pulley P at one end and provided at its other end (Fig. 7) with a gear G which meshes with a larger gear $G^1$ mounted in any desired manner upon one end of the lathe bed. Rotatable bodily with the gear $G^1$ is a small gear $G^2$ which meshes with another large gear $G^3$ on a cam shaft CS. This cam shaft controls the feed rack F and also controls movable work-shaping cutters, but these cutters do not form any part of the invention, nor do the old parts controlled by the cam shaft, and hence, the drawings are stripped of needless illustration of such parts.

All elements so far described by the use of reference letters, are used on machines of the types which I am improving, and these old parts are shown in order to fully disclose the manner in which they co-operate with the new features of the machine. No claim is made for them however, except in combination with features of improvement.

Secured upon the main shaft M, I have shown a friction wheel 1 which is adapted for co-operation with a second wheel 2 (Figs. 3 and 5), for the purpose of driving a grooved pulley 4 on which a flexible line 5 is wound, said line passing over an appropriate guide 6 and being attached at 7 to the carriage C, so that when the wheel 2 is moved into contact with the wheel 1 and the pulley 4 is driven, the line 5 will be wound to return the carriage from the right hand end of the machine to its left hand end, when the operating stroke of said carriage is completed. Preferably, the wheel 2 and pulley 4 are mounted upon a frame 3 which is pivotally or otherwise movably connected at 8 with the main frame structure of the machine, for vertical movement. In the present showing, a spring 9 is secured at one end to the frame 3, and an upstanding link 10 is connected to the other end of said spring for raising or lowering the latter to similarly move the wheel 2, as required. The other end of the link 10 is connected to a crank arm 11 on a transverse rock shaft 12 which extends across the bed B, beneath the travel of the carriage C. The rear end of the shaft 12 is provided with a crank arm 13 (see Figs. 2, 4 and 23), this crank arm 13 being loosely connected at 14 with a longitudinal shaft 15 which is disposed behind and extends throughout the length of the lathe bed, said shaft being slidably supported by bearings on two appropriate brackets 16 and 17, suitably secured to the frame structure of the machine. The right hand end portion of the shaft 15 is also guided by an auxiliary bearing 18 (Fig. 1), and this end of the shaft is provided with a rigid, lateral arm 19 having a roller or similar shoe 20 (see Figs. 1, 4, 7, 8, 23 and 24). This shoe 20 is co-operable with a cam 21 which is mounted on a short transverse shaft 22 behind the right hand end of the lathe bed, the shaft being carried by appropriate bearing means in a third bracket 23 projecting rearwardly from the machine. The shaft 22 is provided with a beveled gear 24 meshing with a beveled portion 25 of another gear 26 which is driven by the gear $G^3$ of the cam shaft CS. The cam 21 is shaped to shift the shaft 15 to the right and to then force laterally on the shoe 20, to cause the arm 19 to turn the shaft 15, so that the shoe is positioned out of the path of the cam, until the shaft is again to be shifted to the right. The portion 27 of the cam effects longitudinal shifting of the shaft and the portion 28 thereof forces the shoe 20 laterally out of the path of said portion 27, after the shifting operation has been performed.

Shifting of the shaft 15 to the right, as above explained, takes place when the carriage has reached the end of its operative stroke, that is, its stroke toward the right hand end of the bed B, and such shifting of the shaft, rocks the transverse shaft 12, causing the arm 11 to pull upwardly upon the link 10, thus swinging the frame 3 upwardly until the wheel 2 is driven by contact with the wheel 1. Then, the line 5 is immediately wound upon the pulley 4, so that the carriage is returned to the left hand end of the bed, the return movement of said carriage being limited by novel means hereinafter described, which also slides shaft 15 to the left.

It will be remembered that after shifting the shaft 15 to the right, the cam 21 has disengaged from the shoe 20, but provision is made for again turning the shaft so that said shoe and cam are in operative relation, when the carriage reaches the end of its next operative stroke. In the present showing, the shaft 15 is provided with a lateral pin 30 (Figs. 4, 9, 15 and 17), and a cam shoe 31 which is suitably secured to the carriage C, is adapted to force downwardly upon said pin 30 when the carriage reaches the end of its stroke, thus turning the shaft 15 to again dispose the shoe 20 in the path of the portion 27 of the cam 21, so that this cam may then operate to slide the shaft 15 to the right and bring the carriage-return means into play as above set forth.

For limiting the return movement of the carriage and shifting the shaft 15 again to the left to throw the carriage-return means out of play, a stop or slide 32 is mounted on the shaft 15 and is also guided by a stationary longitudinal rod 33. This slide 32 is disclosed in Figs. 1, 4, 5, 26, 27 and 28, said slide being provided with a pivoted gripper 34, which is formed with an operating portion 35 extending into the path of a shoe or contact 36 on the carriage C. When this gripper is swung outwardly from the slide 32, as disclosed in Figs. 27 and 28, it does not grip the shaft 15, the extent of its outward swinging being limited by an appropriate stop 37. When however, the shoe 36 strikes the gripper on the return movement of the carriage, it forces said gripper inwardly toward the slide 32 and causes it to tenaciously grip the shaft 15 so that further return movement of the carriage, will shift said shaft 15 to the left, thus effecting turning of the transverse shaft 12 to immediately lower the friction wheel 2, throwing the carriage return means out of play.

Means are provided for setting the stop or slide 32 at different points, so as to stop the carriage C at the proper point to receive the next stick of lumber to be engaged with the stick driver SD. In the present showing, a flexible line 38 is secured to the slide 32 and extends around a guide 39 to a grooved pulley 40 upon which it is adapted to be wound for the purpose of moving said slide to the left, to the maximum, after the carriage has been stopped. This pulley is operated by means described below. Connected with the operating portion 35 of the gripper 34 and extending oppositely from the line 38, is a second line 41 which passes over a guide 42 and is provided with a weight 43. Whenever the slide 32 is released by turning of the pulley 40 in the proper direction to pay out the cable 38, the weight 43 operates to hold the gripper 34 in a released position and pull the slide 32 to the right. This movement of slide 32 is limited by the length of the next stick to be engaged with the stick-driver SD, the slide being provided with a feeler 44 to strike said stick and arrest movement of the slide.

In the present showing, the grooved pulley 40 is free upon a horizontal rock shaft 45 which extends longitudinally behind the bed B and is rotatably mounted in appropriate bearings in the three brackets 16, 17 and 23, said pulley having a lost motion driving connection 46 with said shaft 45, as seen in Figs. 4 and 22. The pulley 40 is connected by a coiled spring 47 with a pinion 48 which is secured on the shaft 45, for a purpose to appear. Also secured on shaft 45, I have illustrated a tight pulley 49, while two comparatively wide pulleys 50 and 51 are loose upon said shaft at opposite sides of said tight pulley. A pair of belts 52 and 53 driven in opposite directions and shown in Figures 1 and 4, are engaged with the pulleys, so that either of them may be shifted onto the tight pulley 49. Thus, the shaft 45 may be driven in a direction to pay out the cable 38 and permit the weight 43 and cable 41 to slide the member 32 in one direction, or said shaft may be driven in the other direction to cause return of the slide 32, by winding the cable 38 on the pulley 40. It has previously been explained that movement of the slide 32 under the action of the cable 41 and weight 43, is limited by the length of the next stick to be fed to the stick driver SD, and if this slide is permitted only a slight movement under the influence of said cable and weight, by a comparatively long stick, the spring 47 takes up slack in the cable 38, as the latter is paid out.

The pulleys 49, 50 and 51 and their co-operating belts, form operating means not only for the pulley 40, but for a stick feeder yet to be described, as well as a stick carrier, which carries the sticks one at a time into alinement with the stick driver SD and the cutter SC; and for controlling this operating means, I have shown a longitudinal shipper rod 54 having arms 55 engaging both of the belts 52 and 53, said shipper rod being pivoted at 56 to a transverse horizontal shipper lever 57 which extends over the rear portion of the bed B. This shipper lever constitutes a main control member and it is illustrated more particularly in Figs. 1, 3, 9, 15, 16 and 17, in which connection, it may be stated that Fig. 16 shows in full lines the neutral or idle position of the shipper lever, as well as showing in dotted lines, its two operative positions, that is the positions which it assumes when shifting one or the other of the belts onto the tight pulley 49. Before the exact manner of shifting the lever 57, to its different positions, can be explained, it will be necessary to describe other parts of the machine.

A feeder, designated in a general way at 58, extends rearwardly from the bed of the machine and is controlled, in a manner hereinafter specifically described, by a longitudinal rock shaft 59 which is mounted in appropriate bearings and is positioned above the shaft 45. This shaft 59 is provided with a gear 60 meshing with the pinion 48 of the shaft 45, as seen in Fig. 4 and Fig. 5, so that when the shaft 45 is rocked in one direction or the other, the shaft 59 is reversely rocked. In rocking in this manner, not only does the shaft 59 control the feeder 58, but it serves to actuate a carrier which is indicated in a general way by the character 61, it being the function of this carrier to move the sticks one at a time from the feeder 58, into alinement with the stick driver SD and the cutter SC. The carrier 61 is provided with a vertical suspending arm 62 (Figs. 3, 9, 14 and 15). This arm 62 is secured by a suitable clamp 63 to a short horizontal rock shaft 64 which is both rockably and slidably mounted in an elevated bearing 65, said bearing being appropriately secured to the upper end of a standard 66 which rises rigidly from the rear porton of the bed B. One end of the bearing 65 is provided with circumferentially spaced lugs 67, and the shaft 64 is equipped with lateral lugs 68 which contact normally with the outer extremities of the lugs 67 as shown in Fig. 3. When the shaft 64 is turned to swing the arm 62 and the carrier 61 forwardly however, the lugs 68 are adapted to ride from the lugs 67, whereupon the entire shaft 64, arm 62 and carrier 61, are bodily shifted to the right by an appropriate coiled spring or the like 69, which is shown more particularly in Figs. 1 and 3. Thus, by the time the carrier 61 has moved a stick of lumber into alinement with the stick driver SD and the cutter SC, said carrier is laterally shifted to force one end of the stick to the cutter so that as soon as the carriage C advances and the stick driver engages the other end of the stick, the latter will start to rotate and feed through the machine.

The shaft 64 is provided with a rearwardly projecting crank arm 70 which may be keyed thereon in a manner to permit longitudinal shifting of the shaft without so shifting the arm. A vertical link 71 is pivoted at its upper end to the crank arm 70 and at its lower end, this link is pivoted to a crank arm 72 on the rock shaft 59. It will thus be seen that rocking of this shaft 59 will serve to project the carrier 61 forwardly to its operative position and later to retract said carrier to an inoperative position, in readiness to receive another stick of lumber.

Preferably, suitable stops 73 and 74 (Figs. 4 and 14) are employed to limit the swinging of the arm 72 and the shaft 59. I also prefer to connect a coiled spring 75 with a portion of the crank arm 72 at its lower end, and to suitably anchor the upper end of said spring to the upper end of the standard 66, an appropriate anchor being shown at 75'. This spring operates on either side of the center about which the arm 72 swings and it thus assists in rocking the shaft 59 either in one direction or the other.

The carrier 61 is by preference of substantially the construction detailed in Figs. 15, 18, 19 and 20, from which views, it will be seen that said carrier embodies a stationary jaw portion 76 and a movable jaw 77 which is disposed above the shipper lever 57, said movable jaw being pivoted at 78, so that it may be opened and closed. A coiled tension spring 79 is preferably connected at one end with the jaw 77 and suitably anchored at its other end to a part of the carrier, said spring being so arranged that when the jaw 77 is started either toward its open or its closed position, the spring will rapidly complete the movement of said jaw. When the carrier 61 is projected to its operative position, disclosed in dotted lines in Fig. 15, initial rotation of the stick held by said carrier, is adapted to start the jaw 77 toward its open position, whereupon the spring 79 quickly completes the downward swinging of the jaw as will be clear from Fig. 15. When this downward swinging of the jaw 77 takes place, said jaw is adapted to depress the shipper lever 57 from the full line position of Fig. 15 to the dotted line position of said figure, thus placing said shipper lever in the path of an upward projection 80 on the feed bar F, which projection is then adapted to move the lever 57 in a direction to effect return of the carrier 61. During this return movement of the carrier, the jaw 77 may be closed by any preferred means, for instance, by an upstanding pin 81 on the shipper lever.

Under the major portion of the carrier 61 and connected with the latter for movement bodily therewith, are two cam bars 82 and 83 which are detailed in Figs. 15 and 16, said bars being disposed at opposite sides of a roller or other shoe 84 on the shipper lever 57. To effect projection of the carrier 61, this lever is shifted to the left hand dotted line position of Fig. 16, by means yet to be described, and as the carrier projects, the cam bar 82 strikes the shoe 84 and returns the shipper lever 57 to its idle position, so that the carrier projecting means is thrown out of play by the time said carrier reaches its extreme forward position. Then, as soon as the stick held by the carrier is rotated by the stick driver SD, the jaw 77 swings open and depresses the shipper lever 57 into the path of the projection 80, so that this projection then moves said shipper lever to the right hand dotted line position of Fig. 16, thus causing reverse movement of the carrier operating means, so that the carrier 61 is returned to its initial position, in readiness to receive another stick.

Before return of the carrier 61 can take place, it is of course necessary to disengage the lugs 68 from locking engagement with the logs 67, which engagement was effected by longtiudinal shifting of the shaft 64 under the influence of the spring 69, upon projection of the carrier 61. To so disengage the two sets of lugs, I have provided a vertical lever 85 which is shown for instance in Figs. 3, 14, 33 and 34, said lever being fulcrumed at 86 to the standard 66. The upper end of lever 85 is forked as indicated at 87 and suitably engaged with the shaft 64, while its lower end is preferably hooked as at 88 and disposed in the path taken by the shipper lever 57, when it is forced to the right by the projection 80 of the feed bar F. Thus, this shipper lever first actuates the lever 85 to longitudinally slide the shaft 64 and disengage the lugs 68 from locking engagement with the lugs 67, and then the shipper lever throws the operating means of the carrier 61 into play, to return the latter, and it will be remembered that this same operating means controls the setting means for the slide 32, as well as controlling the feeder 58.

The feeder 58 is disclosed more particularly in Figs. 10 to 13 and 21, and it preferably includes an inclined frame structure 90, one side of which is connected by an arched bracket 91 with a slide 92, the latter being adjustable in an appropriate guide-way 93 of the standard 66, by means of an adjusting screw 94, an appropriate clamp 95 being provided for holding said slide in adjusted position. Opposed sides of the frame 90 are preferably provided with projecting collars 96 through which the rock shaft 59 passes, bearings 97 being mounted on said shaft within the collars and being capable of slight radial adjustment by appropriate set-screws 98.

At the front and rear ends of the feeder frame 90, shafts 99 and 100 are provided, these shafts being equipped with sprockets 101 and 102, around which an endless feed apron 103 is trained, said apron having outwardly projecting slats or flanges 104 which define individual channels into which the sticks of lumber are placed by hand, so that each time the apron 103 is advanced the proper amount, one of these sticks will be positioned in the carrier 61, in engagement with its fixed and movable jaws, as will be clear by reference to Fig. 9. If desired, one or both of these jaws may be slightly beveled so that the stick may easily move into the space between them. Secured upon the shaft 100, I have shown a ratchet wheel 105 which co-acts with a dog 106 on a lever 107 which is fulcrumed on said shaft 100, this lever being provided at its free end with an operating weight 108. Novel provision is made whereby the movement of the rock shaft 59, which effects forward projection of the carrier 61, will not raise the lever 107, while the movement of said shaft 59 which effects return of said carrier, will first raise said lever 107, as shown in Fig. 12 and will release this lever by the time the carrier 61 has completely retracted. Thus, dropping of the weighted arm or lever 107 to the extent limited by the stop 109 (Fig. 11) will cause the dog 106 and ratchet wheel 105 to turn the shaft 100 a sufficient distance to place another stick into the carrier which has just returned. The preferred construction for operating the arm or lever 107 is detailed in Figs. 11, 12 and 13. In these figures, 110 designates a lateral lug on the lever 107, the lower side of which lug constitutes a track face. The lower end of a pivoted member 111, carried by the lever 107, co-acts with the front end of the track face of the lug 110, in forming a complete track, and hence said member 111 may be termed a movable track section. Pivoted to one side member of the frame 90, is a setting and releasing member for the lever 107, that is this member raises said lever or sets it at a predetermined elevation and then releases it, so that it may descend by gravity to operate the feeder. This setting and releasing member is indicated at 112 and its pivot is shown at 113, said pivot connecting said member with the frame 90. The member in question is provided with a roller or other shoe 114 which co-acts with the track formed by the lug 110 and the track section 111, and by means of an operating link 115, the member 112 is connected with a crank arm 116 on the rock shaft 59. Figure 11 shows the position of parts when the carrier 61 occupies its foremost position to present a stick to the stick driver of the carriage C and to the cutting means. As the shaft 59 is turned however in a direction to retract the carrier 61 to the position disclosed in Fig. 9, the arm 116 and the link 115, cause the roller 114 to force upwardly, first upon the track section 111 and then upon the track face of the lug 110, thus raising the lever 107 as indicated in Fig. 12. This raising takes place until the carrier 61 has been completely retracted in position to receive another stick. By this time however, the roller 114 has run off of the lug 110, permitting the lever 107 to drop by gravity as shown in Fig. 13, thus advancing the apron 103 and disposing another stick in the carrier. Upon turning of the shaft 59 in a direction to again project the carrier 61, the roller 114 passes over the lug 110, tilts the track section 111 upwardly out of its way and then releases said track section, and finally, by the time the carrier has been completely projected, the roller 114 is again in engagement with the lower end of the track section 111, as shown in Fig. 11, so that the parts are in readiness for further operation.

It may here be explained that after the carrier 61 returns to the position of Fig. 9 from its projected operative position, and a stick is engaged with said carrier, the carriage C which has engaged the previously moved stick, feeds toward the right and the slide 32 follows said carriage until its feeler 44 strikes the stick which has just been placed in the carrier 61. Further movement of the slide 32 is thus limited, so that it is in readiness to have the end 35 of the gripper 34 engaged by the shoe 36 when the carriage next returns, stopping said carriage at the proper point to permit reception of the stick with which the feeler is in contact, between the stick driver SD and the cutter SC. When the end 35 of the gripper 34 is engaged by the shoe 36, said gripper grips the shaft 15, slides it to the left to throw the carriage-return means out of play, and this movement of the shaft 15 is utilized also for the purpose of shifting the shipper lever 57 to the left, to then effect projection of the carrier 61, with the stick previously engaged by the feeler 44. For so shifting the shipper lever 57, I employ a short transverse rock shaft 117 (Figs. 3, 4, 9, 15 and 17), said shaft being mounted in an appropriate bearing 118 carried by the lathe bed and being provided on its ends with upstanding crank arms 119 and 120, the arm 119 being positioned in the path taken by the pin 30 when the shaft 15 is moved to the left, while by any suitable means, such as the hook 121, the arm 120 is operatively connected with the shipper lever 57. It thus follows that when the shaft 15 is slid toward the left, by the operation of the slide 32 under the influence of the shoe 36, pin 30 swings the arm 119, this arm turns the shaft 117, and this shaft operates the arm 120 to shift the shipper lever 57 to the left hand dotted line position of Fig. 16, in which position, the operating means for the carrier 61 is brought into play to project said carrier.

In the first portion of this description, I referred to knocking of the stick remnant or "stub short" from the stick driver or chuck of the carriage, upon return of the latter. For accomplishing this end, I have provided a lever 122 fulcrumed on the carriage with one end adapted to swing in front of the chuck, its other end having a roller or other shoe 123 which is adapted to engage a cam 124 upon return of the carriage, said cam being carried by a longitudinal bar 125 which is connected at one end to a crank arm 126 on the rock shaft 12, while its other end is connected to a similar crank arm 127 on another transverse shaft 128. When the shaft 12 is rocked in a direction to throw the carriage-returning means into play, the bar 125 is raised so as to position the cam 124 in a manner to engage the shoe 123 when the carriage returns, thus operating the lever 122 to knock the stick remnant or "stub short" from the chuck SD. The bar 125 is also adapted to engage a crank arm 129 on the rock shaft R, when said bar is raised, as seen for instance in Fig. 30, thus rocking said shaft to hold the feed dog D out of engagement with the feed rack F while the carriage is being returned. Obviously, when shaft 12 is rocked to throw the carriage return means out of play, the bar 125 and the cam 124 will be again lowered.

In the foregoing, a number of individual mechanisms and their operations have been described, but in the following, an explanation is given of the manner in which the severeal groups of parts jointly co-operate in producing the desired results.

When the parts stand as shown in Figs. 1 and 3, the carriage C is returning to the left and the carrier 61 is holding a stick, in readiness to move it forwardly. The shoe 36 of the carriage is in contact with the operating portion 35 of the gripper 34 with which the slide 32 is equipped, and said shoe is in readiness to swing the gripper inwardly to operative position, so that further return movement of the carriage will shift the shaft 15 to the left, throwing the carriage-return means out of play and causing the parts 30, 119, 117 and 120, to shift the shipper lever 57 to the left. This will shift the belt 52 onto the tight pulley 49 and cause turning of the shaft 45 in a direction to project the carrier 61 into alinement with the cutter and the carriage chuck. Turning of the shaft 45 in this manner moves the setting and releasing device 112 of the feeder 58 from the position of Fig. 13 to that of Fig. 11, so that its roller or shoe 114 engages the free end of the pivoted track section 111. Turning of shaft 45 has also caused rotation of the grooved pulley 40 to wind the cable or line 38, thus throwing the slide 32 entirely to the left. When the carrier 61 nears its extreme forward movement, the cam bar 82 strikes the roller 84 and moves the shipper lever 57 to its central idle position, stopping the shaft 45 by the time the carrier 61 is at its extreme forward position. When such position is reached, the shaft 64 is horizontally slid by the spring 69 to shift the stick held by the carrier longitudinally to the cutter, at the same time causing the lugs 67 and 68 to lock the arm 62 and the carrier. The carriage C now advances and its rotating chuck or other stick-driver SD, engages the stick held by the carrier 61. Thus, the stick is rotated and this rotation initially starts the jaw 77 toward its open position, and such opening movement of the jaw is completed by the spring 79. As jaw 77 swings downwardly, it forces the shipper lever 57 downwardly into the path of the projection 80 on the feed bar F. Then, this projection forces the shipper lever to the right and the first work accomplished by this movement, is the actuation of the lever 85 to release the lugs 68 from the lugs 67 by longitudinally sliding the shaft 64 against the action of the spring 69. The next thing accomplished by shifting of the shipper lever to the right, is the movement of the belt 53 onto the tight pulley 49, so that the shaft 45 is turned to retract the carrier 61 to its initial position, at the front end of the feeder 58. While this turning is taking place, the roller 114 of the setting and releasing device 112, is forcing upwardly on the track 110—111, thus raising the lever 107. When the carrier 61 has completely returned to its retracted position, the roller runs off from the track and the weighted lever 107 immediately drops, causing the dog 106 and ratchet 105 to advance the feed apron 103, placing another stick in the carrier. While this has been taking place, the turning of the shaft 45 has caused the grooved pulley 40 to pay out the cable 38, so that the weight 43 and line 41, draw the slide 32 to the right until the end 35 of the gripper 34 strikes the shoe 36 of the carriage. Then, as the carriage feeds to the right, the slide 32 follows it, until the feeler 44 of said slide strikes the stick just placed in the carrier 61. The slide 32 then comes to rest, after first pushing the stick slightly through the carrier if desired. The carriage however proceeds to the right to advance the stick through the cutting and shaping means, and when the last turning has been cut off, the cam 31 on the carriage C, strikes the pin 30 on the shaft 15, turning this shaft to place its roller 20 in the path of the portion 27 of the cam 21. This cam, then immediately pulls the shaft 15 to the right and again moves the roller 20 out of its path. Sliding of the shaft 15 to the right in this manner, turns the transverse rock shaft 12 and causes raising of the friction wheel 2 into contact with the driven wheel 1. This winds the line 5 and returns the carriage to the left, the bar 125 having been also raised by movement of the shaft 12 so that the dog D is disengaged from the feed rack F and the cam 124 is positioned to operate the lever 122 and knock the "stub short" from the carriage chuck, as the latter returns. As soon as the shoe 36 comes into engagement with the end 35 of the gripper 34, further return movement of the carriage pulls the rod 15 to the left, again effecting lowering of the wheel 2 and throwing the carriage-returning means out of play. Thus movement of the shaft 15 to the left, also causes the pin 30 to act in the manner above set forth, for effecting movement of the shipper lever 57 again to the left, so that another cycle starts.

It will be seen from the foregoing that a very effective machine has been provided for carrying out the objects of the invention and as excellent results may be obtained from the details disclosed, they may well be followed. However, it is to be understood that the present disclosure is for illustrative purposes only and that within the scope of the invention as claimed, numerous changes may be made.

I claim:

1. In combination, a lathe bed having stationary cutting means for sticks of lumber, a carriage movable along the bed toward said cutting means and having a driven stick-rotating member, means offset from the axis of said stick-rotating member for supporting a plurality of the sticks in parallel relation with the bed, a carrier for moving the sticks one at a time from said supporting means into alinement with the stick-rotating member and cutter, means for then moving said carrier to longitudinally move the stick into engagement with the cutter, means for now advancing said carriage to feed the stick to the cutting means, means for automatically returning the carriage after each complete advancement thereof, means for automatically moving said carrier to operative position after each return of said carriage and for returning said carrier after engagement of the stick by the stick-rotating member, and means for operating said supporting means to place a stick in said carrier upon each return thereof.

2. In combination, a lathe bed having stationary cutting means for sticks of lumber, a carriage movable along the bed toward said cutting means and having a stick-driving member, means offset from the axis of said driving member for supporting a plurality of the sticks, a carrier for moving the sticks one at a time from said supporting means into alinement with the stick-driving member, means for automatically returning the carriage after each complete advancement thereof, means controlled by the length of the next stick to be turned, for limiting the return movement of the carriage, means for automatically moving said carrier to operative position after each return of said carriage and for returning said carrier after engagement of the stick by the stick-driving member, and means for operating said supporting means to place a stick in said carrier upon each return therof.

3. In combination, a bed, stationary cutting means on said bed for engaging one end of a stick, a stick rack at one side of the bed for holding sticks in parallel relation with said bed, a carrier for moving sticks one at a time from said rack to said cutting means, means for first moving said carrier transversely of the bed to move a stick from the rack and dispose it in alinement with said cutting means and for then shifting said carrier longitudinally of the bed to shift the stick into engagement with said cutting means, and stick-rotating and advancing means movable along the bed into engagement with the stick when the latter is engaged with said cutting means.

4. In combination, a bed, a member thereon for engaging one end of a stick, a carrier for moving sticks one at a time to said end-engaging member, and means for first moving said carrier to dispose the stick held thereby in alinement with said end-engaging member, for then shifting said carrier in another direction to longitudinally move the stick to the end-engaging member and for locking said carrier in the last named position, and additional means on the bed adapted to move into engagement with the other end of the stick while the carrier is locked in its last named position.

5. In combination, a bed, means thereon for engaging one end of a stick, a carrier for moving sticks one at a time to said end-engaging means, a horizontal shaft on which said carrier is secured, a stationary bearing for said shaft, means for turning said shaft in said bearing to move a stick into alinement with said end-engaging means, and means for then effecting sliding of the shaft in the bearing to longitudinally move the stick toward said end-engaging means, said means for effecting sliding of the shaft comprising a spring acting on said shaft, and co-acting means on the shaft and bearing for holding the shaft against sliding until turned to a predetermined position.

6. In combination, a movably mounted carrier adapted to move sticks of lumber one at a time to a predetermined point, operating means for projecting said carrier to operative position or retracting it to inoperative position, including a control member adjacent the carrier having one position for projecting said carrier, a second position for retracting the carrier, and a third idle position, means for shifting said control member to its first position to project the carrier, means operated by the projection of said carrier for then moving said control member to its idle position, means for later moving said control member to its second position to retract the carrier, and means operated by the carrier for again restoring the control member to its idle position as said carrier is retracted.

7. In combination, a movably mounted carrier adapted to move sticks of lumber one at a time to a predetermined point, operating means for projecting said carrier to operative position or retracting it to inoperative position, including a control member adjacent the carrier having one position for projecting said carrier, a second position for retracting the carrier, and a third idle position, means for shifting said control member to its first position to project the carrier, a cam movable bodily with said carrier for moving said control member to its idle position as said carrier is projected, means for later moving said control member to its second position to retract the carrier, and a second cam movable bodily with said carrier for again restoring the control member to its idle position as said carrier is retracted.

8. In combination, a carrier having an upstanding arm pivotally mounted on a horizontal axis, said carrier being adapted to move sticks of lumber one at a time to a predetermined point, operating means for swinging said carrier to a projected operative position or for returning said carrier to a retracted inoperative position, including a substantially horizontal control lever fulcrumed on a substantially vertical axis under said carrier, said lever having one position for projecting the carrier, a second position for retracting said carrier and a third idle position, means for shifting said lever to its first position to project the carrier, a cam bar under and movable bodily with said carrier for moving the lever to its idle position as the carrier is projected, means for later moving said lever to its second position to retract the carrier, and a second cam bar under and movable bodily with said carrier for again moving said lever to idle position as the carrier retracts, said lever having a projection co-operable with said cam bars.

9. In combination, means for rotating a stick of lumber, a carrier for moving sticks one at a time to said rotating means, said carrier having a stick-holding jaw adapted to be initially released by rotation of the stick held thereby, and spring means for then rapidly moving said jaw to a completely open position.

10. In combination, means for rotating a stick of lumber, a proceeding and receding carrier for moving sticks one at a time to said rotating means, said carrier having a pivoted stick-holding jaw adapted to be initially released by rotation of the stick held thereby, spring means connected to said paw and operable at either side of its pivot to either open or close said jaw after it is initially started, and means for starting said jaw toward closed position upon the receding movement of the carrier.

11. In combination, means for rotating a stick of lumber, a carrier for moving sticks one at a time to said rotating means, said carrier having a stick-holding jaw adapted for movement to a released position by rotation of the stick held thereby, means for projecting said carrier to operative position or for retracting it to inoperative position, including a control member having one position for projecting the carrier, a second position for retracting said carrier and a third idle position, means for moving said control member to its first position to project the carrier, means for automatically shifting said control member to its idle position as the carrier is projected, a movable operating member adjacent but normally disengaged from said control member, the aforesaid jaw being adapted to force the control member into operative engagement with said operating member when said jaw is opened, whereby to effect shifting of said control member to its second position to retract the carrier, and means for automatically restoring said control member to its idle position as the carrier is retracted.

12. In combination, means for rotating a stick of lumber, a carrier for moving sticks one at a time to said rotating means, said carrier having a pivoted stick holding jaw adapted to be swung downwardly to released position by rotation of a stick held thereby, means for projecting said carrier to operative position or for retracting it to inoperative position, including a control member under said jaw, said control member having one position for projecting the carrier, a second position for retracting said carrier and a third idle position; means for moving said control member to its first position to project the carrier, means for automatically moving said control member to its idle position when the carrier is projected, a movable operating member under said control member, the aforesaid jaw being adapted to depress the control member into operative engagement with said operating member when said jaw opens, whereby to effect shifting of said control member to its second position for retracting the carrier, and means for automatically shifting said control member to its idle position as the carrier is retracted.

13. In combination, a bed, a carriage thereon, means on said carriage for rotating a stick of lumber, a feed bar movable longitudinally of the bed for sliding said carriage, a carrier for feeding sticks one at a time to said stick rotating means, said carrier having a stick holding jaw adapted to be released by rotation of a stick held thereby, means for projecting said carrier to operative position or for retracting it including a control member adjacent said movable jaw, said control member being movable to one position for projecting the carrier, to a second position for retracting said carrier, and to a third idle position; means for moving said control member to its first position to project the carrier, means for automatically shifting said control member to its idle position as the carrier is projected, opening of the above-named jaw being adapted to operatively engage said control member with the aforesaid feed bar, whereby to effect shifting of said control member to its second position to retract the carrier, and means for automatically returning the control member to its idle position as said carrier is retracted.

14. In combination, a bed, a carriage thereon having means for holding a stick of lumber, said carriage being adapted to advance the stick along the bed, means offset from the carriage for supporting a plurality of sticks, means for moving one of said sticks to said holding means after each return of the carriage, a stop for limiting the return movement of the carriage, said stop being mounted for movement longitudinally of the bed to different positions, and means for automatically setting said stop following advancement of the carriage, according to the length of the next stick to be moved to the stick-holding means.

15. In combination, a bed, a carriage thereon having means for holding a stick of lumber, said carriage being adapted to advance the stick along the bed, means offset from the carriage for supporting a plurality of sticks, means for moving one of said sticks to said holding means after each return of the carriage, a stop for limiting the return movement of the carriage, said stop being mounted for movement longitudinally of the bed to different positions, and means for shifting said stop following advancement of the carriage, said stop having a check adapted to limit its movement by striking the next stick to be moved to the stick-holding means.

16. In combination, a bed, a carriage thereon having means for holding a stick of lumber, said carriage being adapted to advance the stick along the bed, means offset from the carriage for supporting a plurality of sticks, means for moving one of said sticks to said holding means after each return of the carriage, a stop for limiting the return movement of the carriage, said stop being mounted for sliding longitudinally of the bed to different positions, flexible lines extending oppositely from the block and guides for said lines, a pulley on which one of said lines is wound, means for driving said pulley to move the stop to the end of the bed at which the carriage starts its operative stroke, line-pulling means constantly acting on the other line, and means for releasing said pulley to permit said stop to follow the carriage toward the other end of the bed, said stop having a check adapted to limit its movement by striking the next stick to be moved to the stick-holding means.

17. A structure as specified in claim 16; together with a resilient connection between said pulley and its operating means, for the purpose set forth.

18. In combination, a bed, a carriage thereon having means for holding a stick of lumber, said carriage being adapted to advance the stick along the bed, means offset from the carriage for supporting a plurality of sticks, means for automatically returning the carriage after each complete advancement thereof, means for moving one of the sticks to the stick-holding means after each return of the carriage, a combined stop member for said carriage and throw-out member for the carriage returning means, said combined member being mounted for movement longitudinally of the bed to different positions, and means for automatically setting said member following advancement of the carriage, according to the length of the stick to be moved to the stick-holding means upon the return of said carriage.

19. In combination, a bed, a carriage thereon having means for holding a stick of lumber, said carriage being adapted to advance the stick along the bed, means offset from the carriage for supporting a plurality of sticks, means for automatically returning the carriage after each complete advancement thereof, means for moving one of the sticks to the stick-holding means after each return of the carriage, a combined stop member for said carriage and throw-out member for the carriage returning means, said combined member being mounted for movement longitudinally of the bed to different positions, and means for effecting shifting of said stop following advancement of the carriage, said stop having a check adapted to limit its movement by striking the next stick to be moved to the stick-holding means upon return of the carriage.

20. In combination, a bed, a carriage thereon having means for holding a stick of lumber, said carriage being adapted to advance the stick along the bed, means offset from the carriage for supporting a plurality of sticks, means for automatically returning the carriage after each complete advancement thereof, means for moving one of the sticks to the stick-holding means after each return of the carriage, a longitudinally movable shaft extending longitudinally of the bed for controlling said carriage-returning means, a slide on said shaft having a gripper for engaging said shaft, said gripper having an operating portion in the return path of the carriage for causing said carriage upon its return to shift the shaft and throw the carriage-returning means out of play, and means for moving said slide freely along said shaft following advancement of the carriage, said stop having a portion for limiting its movement by striking the stick to be moved to the stick-holding means upon return of the carriage.

21. A structure as specified in claim 20; said means for moving said slide along said shaft being connected to said operating portion of said gripper to hold the latter in released position while so moving said slide.

22. In combination, a bed, a carriage thereon, a feed bar extending longitudinally of the bed, a dog mounted on the carriage for co-action with the feed bar in feeding the carriage toward one end of the bed, return means for said carriage, means for throwing said return means into play, including a rock shaft extending transversely of the bed; a longitudinal track under the aforesaid dog for moving the latter from the feed rack when raised, and means on the aforesaid rock shaft for so raising said track when the shaft is turned to throw the carriage return means into play.

23. In combination, a bed, a carriage thereon, a feed bar extending longitudinally of the bed, a dog mounted on the carriage for co-action with the feed bar in feeding the carriage toward one end of the bed, return means for said carriage, means for throwing said return means into play, including a rock shaft extending transversely of the bed; a longitudinal track under the aforesaid dog for moving the latter from the feed rack when raised, a crank arm on the rock shaft pivoted to one end of said track for moving said track upwardly and longitudinally when said shaft is turned in a direction to throw the carriage return means into play, and means operated by the longitudinal movement of said track for raising its other end.

24. In combination, a bed, a carriage thereon adapted to be fed toward one end thereof, said carriage having means for holding one end of a stick to be successively cut off as the carriage advances, means for returning the carriage, a member mounted on said carriage and having a portion movable in front of said holding means for knocking the stick remnant from said holding means as the carriage returns, a normally idle cam for operating said member, and means for moving the cam into the return path on which said member is moved by the carriage, whereby said member will be engaged by the cam as the carriage returns.

25. In a wood working machine having a bed, a carriage thereon having a work-rotating member, feeding means for said carriage, a normally lowered throw-out member for said feeding means, and means for raising said throw-out member to operative position; a movable member on said carriage for knocking a work remnant from the work-rotating member when the carriage returns, and an operating cam for said movable member mounted on the aforesaid throw-out member and raised to an operative position thereby.

26. In combination, a carrier adapted to move sticks of wood one at a time to a predetermined point, means for projecting and retracting said carrier, including a rock shaft and means for turning it in one direction to project the carrier and in the other direction to retract said carrier, a feeder for supplying sticks to the carrier, operating means for said feeder adapted to be set at one position and then released to bring it into play, and means actuated by said rock shaft for so setting said feeder operating means during the carrier projecting and retracting movements of said rock shaft and for releasing said feeder operating means when the carrier is completely retracted.

27. In combination, a carrier adapted to move sticks of wood one at a time to a predetermined point, means for projecting and retracting said carrier, including a rock shaft and means for turning it in one direction to project the carrier and in the other direction to retract said carrier, a feeder for supplying sticks to the carrier, operating means for said feeder having a member adapted to be set at one position and then released to bring said operating means into play, a setting and releasing device adapted to proceed in one direction to set said member and then release it, and adapted to then idly retract, and operating means for said setting and releasing device connecting it with the aforesaid rock shaft to receive motion therefrom synchronously with the movements of the aforesaid carrier.

28. In combination, a carrier adapted to move sticks of wood one at a time to a predetermined point, means for projecting and retracting said carrier, including a rock shaft and means for turning it in one direction to project the carrier and in the other direction to retract said carrier, a feeder for supplying sticks to the carrier, operating means for said feeder having a member adapted to be set at one position and then released to bring said operating means into play, said member having a track face and a movable track section at one end of said face co-operable therewith in forming a complete track, a setting and releasing device adapted to proceed from one end of said track to the other end thereof to first set and then release said member, and then adapted to retract past said movable track section in readiness for further operation, and operating means for said setting and releasing device connecting it with the aforesaid rock shaft to receive motion therefrom synchronously with the movements of the aforesaid carrier.

29. In combination, a carrier adapted to move sticks of lumber one at a time to a predetermined point, means for projecting and retracting said carrier, a feeder for supplying the sticks to the carrier, and means for operating said feeder including a weighted pivotally mounted arm adapted to be first raised and then released to permit it to descend by gravity and operate the feeder, and means for raising said arm as the aforesaid carrier is retracted and for releasing it when said carrier is completely retracted.

30. In combination, a carrier adapted to move sticks of wood one at a time to a predetermined point, means for projecting and retracting said carrier including a rock shaft and means for turning it in one direction to project the carrier and in the other direction to retract said carrier, a feeder for supplying sticks to the carrier, operating means for said feeder including a weighted pivotally mounted arm adapted to be first raised and then released to permit it to descend by gravity and operate the feeder, said arm having a track face and a pivoted track section at one end thereof co-operable therewith in forming a complete track, a pivoted raising and releasing member for said arm having a shoe co-operable with said track for raising the arm and then disengaging from the track to release said arm when said raising and releasing member is swung in one direction, said shoe being adapted to move idly toward its starting position past said pivoted track section when said raising and releasing member is moved in the other direction, an operating link pivoted to said raising and releasing member, and an arm on the aforesaid rock shaft to which said link is pivoted.

31. In combination, a standard, a swinging carrier mounted thereon and adapted to carry sticks of lumber to a predetermined point, operating means for said carrier including a horizontal rock shaft adjacent the lower end of the standard, a feeder for directing sticks one at a time to said carrier, said feeder having a supporting frame adjustably connected with said standard, said frame having a collar, a bearing in said collar receiving the aforesaid shaft, means for radially adjusting said collar with respect to the bearing, and means actuated by the aforesaid shaft for operating said feeder.

32. In combination, a bed, a carriage thereon having means for holding a stick of lumber, said carriage being adapted to be advanced toward one end of the bed, means for returning said carriage, a slidably mounted shaft extending longitudinally of the bed for throwing said carriage-returning means into play when slid in one direction and for throwing said returning means out of play when slid in the other direction, means for sliding said shaft in the aforesaid one direction and then releasing it to effect return of the carriage, a stop on said shaft in the return path of the carriage for sliding the shaft in the other direction to throw its returning means out of play, means at one side of the bed for holding a plurality of sticks, a carrier mounted for movement transversely of the bed for feeding one of said sticks to the stick-holding means of the carriage, each time said carriage returns, operating means for said carrier including a control member having one position for effecting projection of said carrier, means actuated by the second named sliding movement of the aforesaid shaft for shifting said control member to said one position to project the carrier, and means for shifting said control member to produce return movement of the carrier.

33. In combination, a bed, a carriage thereon having means for holding a stick of lumber, said carriage being adapted to be advanced toward one end of the bed, means for returning said carriage, a slidably mounted shaft extending longitudinally of the bed for throwing said carriage-returning means into play when slid in one direction and for throwing said returning means out of play when slid in the other direction, means for sliding said shaft in the aforesaid one direction and then releasing it to effect return of the carriage, a stop on said shaft in the return path of the carriage for sliding the shaft in the other direction to throw its returning means out of play, a carrier mounted for movement transversely of the bed to move a stick to the stick-holding means of the carriage after each return of said carriage, a feeder at one side of the bed for engaging a stick with said carrier after each retraction of the latter, operating means for said carrier and said feeder having a control member movable to one position to effect projection of the carrier to operative position, means actuated by the second named sliding movement of the aforesaid shaft for shifting said control member to said one position to project the carrier, and means for otherwise shifting said control member to return the carrier and operate said feeder.

34. A structure as specified in claim 33; the aforesaid stop being slidable to different operative positions on said shaft, and means actuated by the aforesaid operating means for effecting sliding of said stop, the latter having a movement limiting portion adapted to strike the next stick to be moved by the carrier.

35. In combination, a bed a carriage thereon having means for holding a stick, said carriage being adapted to be advanced toward one end of the bed, a projectible and retractible carrier mounted for movement transversely of the bed and adapted for moving sticks one at a time to said stick-holding means, a feeder at one side of the bed for engaging a stick with said carrier after each retraction of the latter, operating means for said carrier and said feeder including a rock shaft extending longitudinally of the bed, a stop for limiting the return movement of the aforesaid carriage, and means for moving said stop controlled by said rock shaft.

36. In combination, a bed, a carriage thereon having means for holding a stick, said carriage being adapted to be advanced toward one end of the bed, a projectible and retractible carrier mounted for movement transversely of the bed and adapted for moving sticks one at a time to said stick-holding means, a feeder at one side of the bed for engaging a stick with said carrier after each retraction of the latter, operating means for said carrier and said feeder including a rock shaft extending longitudinally of the bed, a stop for limiting the return movement of the carriage, said stop being mounted for movement longitudinally of the bed to different operative positions, moving and setting means for said stop including a flexible line and a pulley on which it is wound, and operating connections between said pulley and the aforesaid shaft.

37. In combination, a bed, a stationary cutter thereon, a carriage on the bed adapted to be moved toward said cutter and having a stick-driving member axially alined with the cutter, means for automatically returning the carriage after each advancement thereof, means for automatically placing a stick between and in axial alinement with the cutter and the stick-driving member after each retraction of the carriage, said stick-placing means including a movable stick-holding jaw adapted to be opened by initial rotation of a stick held thereby when the latter is engaged with the cutter and driving member, and means brought into play by opening of said jaw for moving said stick-placing means aside.

In testimony whereof I have hereunto affixed my signature.

HOWARD F. MAXIM.